(12) United States Patent
Herlem et al.

(10) Patent No.: US 10,625,597 B2
(45) Date of Patent: Apr. 21, 2020

(54) AIR INFLOW CONTROL SYSTEM FOR AN ACTIVE GRILLE SHUTTER

(71) Applicant: Valeo Systemes Thermiques, Le Mesnil Saint Denis (FR)

(72) Inventors: Jean-Paul Herlem, Le Mesnil Saint Denis (FR); Sylvain Gerber, Le Mesnil Saint-Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 0 days.

(21) Appl. No.: 16/069,240

(22) PCT Filed: Jan. 19, 2017

(86) PCT No.: PCT/FR2017/050112
§ 371 (c)(1),
(2) Date: Jul. 11, 2018

(87) PCT Pub. No.: WO2017/125686
PCT Pub. Date: Jul. 27, 2017

(65) Prior Publication Data
US 2019/0023122 A1 Jan. 24, 2019

(30) Foreign Application Priority Data
Jan. 20, 2016 (FR) ...................................... 16 50439

(51) Int. Cl.
*B60K 11/00* (2006.01)
*B60K 11/08* (2006.01)
*B60K 11/06* (2006.01)

(52) U.S. Cl.
CPC ............ *B60K 11/085* (2013.01); *B60K 11/06* (2013.01); *Y02T 10/88* (2013.01)

(58) Field of Classification Search
CPC ............................. B60K 11/085; B60K 11/06
See application file for complete search history.

(56) References Cited

U.S. PATENT DOCUMENTS 4,735,288 A * 4/1988 Uematsu ................... F16N 7/34
184/55.1
4,753,288 A 6/1988 Harvey
(Continued)

FOREIGN PATENT DOCUMENTS

| EP | 2 641 768 A1 | 9/2013 |
|---|---|---|
| GB | 2 332 656 A | 6/1999 |
| WO | 2015/074675 A1 | 5/2015 |

OTHER PUBLICATIONS

International Search Report issued in PCT/FR2017/050112 dated Jul. 12, 2017 (2 pages).
(Continued)

*Primary Examiner* — Hau V Phan
(74) *Attorney, Agent, or Firm* — Osha Liang LLP

(57) ABSTRACT

An air inflow control system for an active grille shutter is disclosed. The air inflow control system includes a frame including at least one housing, a flap including a flap rotary shaft, and a mechanical part adapted to maintain the rotary shaft in the housing when the mechanical part is secured to the frame. The flap rotary shaft may be installed in the housing, the flap may be capable of being placed, by rotation about the rotary shaft, in at least one open position and one closed position. The mechanical part may include an abutment, where the flap may be positioned against the abutment when the flap is placed in the open position.

11 Claims, 6 Drawing Sheets

(56) References Cited

U.S. PATENT DOCUMENTS

| | | | | |
|---|---|---|---|---|
| 5,727,054 | A * | 3/1998 | Anello | H04M 17/026 379/143 |
| 6,145,251 | A * | 11/2000 | Ricci | E06B 7/096 49/74.1 |
| 6,854,544 | B2 * | 2/2005 | Vide | B60K 11/085 180/68.1 |
| 8,444,215 | B2 * | 5/2013 | Bernt | B60K 11/085 296/193.1 |
| 8,505,660 | B2 * | 8/2013 | Fenchak | B60K 11/085 180/68.1 |
| 8,561,738 | B2 * | 10/2013 | Charnesky | B60K 11/085 180/68.1 |
| 8,919,470 | B2 * | 12/2014 | Hori | B60K 11/085 180/68.1 |
| 8,973,607 | B2 * | 3/2015 | Schwarz | B60K 11/085 137/601.08 |
| 9,333,850 | B2 * | 5/2016 | Ruppert | B60R 19/52 |
| 9,586,625 | B2 * | 3/2017 | Crane | B60K 11/085 |
| 2010/0282533 | A1 * | 11/2010 | Sugiyama | B60K 11/085 180/68.1 |
| 2013/0337923 | A1 * | 12/2013 | Knauer | B60K 11/085 464/38 |
| 2014/0273806 | A1 * | 9/2014 | Frayer, III | B60K 11/085 454/335 |

OTHER PUBLICATIONS

Written Opinion of the International Searching Authority issued in PCT/FR2017/050112 dated Jul. 12, 2017 (5 pages).

* cited by examiner

AIR INFLOW CONTROL SYSTEM FOR AN ACTIVE GRILLE SHUTTER

BACKGROUND

The present invention relates to the field of air inflow control for a motor vehicle, and in particular for the active grille shutters of a vehicle.

SUMMARY

A vehicle may comprise a shutter device, sometimes referred to as an active grille shutter, or also as a controlled air inflow module. A suchlike device is also designated by the acronym AGS (for "Active Grille Shutter" in English).

The device permits the access of air via a motor vehicle grille to be opened or closed.

In the open position, the air is able to circulate through the grille and to play a part in the cooling of the engine of the motor vehicle. In the closed position, the air does not enter via the grille, which reduces the drag and thereby makes it possible to reduce the consumption of fuel and emissions of $CO_2$.

The AGS thus makes it possible to reduce the consumption of energy and the pollution when the engine does not need to be cooled by the outdoor air.

An AGS comprises in a conventional manner an activator (also referred to as actuator or motor) controlling the flaps and permitting the opening or closing of the air inflow. The flaps are open when the engine of the motor vehicle has a requirement for cooling, and the flaps are closed when the engine of the motor vehicle is sufficiently cooled.

It has been noted by the applicant that the flaps (in the open position) may vibrate under the effect of the turbulent flow of the air entering the grille. This vibration gives rise in particular to fatigue in the constituent materials of the flaps and to significant noise pollution.

Furthermore, it has been noted by the applicant that the flaps could become detached form their frame (or "frame" in English) under certain conditions such as excessive vibrations of the flaps, manipulation by operatives during assembly operations on the motor vehicle, and impact by particles/objects penetrating into the grille when the motor vehicle is in motion.

In fact, the flaps are often secured to the frame only by "clipping" or by assembly at 45° (i.e. the flap rotary shaft in the area of the frame possesses an elongated cross section capable of being introduced into the frame via an orifice by offering up the smallest cross section of this shaft, and, once it has been introduced and placed in its operating position, the rotary shaft is no longer able to exit via the orifice, the rotary shaft then exhibiting at the orifice a larger cross section than the size of the orifice).

This mode of attachment does not always allow the flaps to be maintained correctly on the frame in the case of heavy vibrations, the presence of foreign bodies introduced via the grille, or even in the case of extensive manipulations.

Therefore, the need exists to limit the vibrations of the flaps of the AGS when the motor vehicle is in motion, in particular in order to ensure the adequate maintenance of these flaps on the frame of the AGS.

The present invention will improve the situation.

The present invention thus proposes an air inflow control system for an active grille shutter, comprising:

a frame comprising at least one housing;

a flap comprising a flap rotary shaft, said flap rotary shaft being adapted for installation in said housing, the flap being capable of being placed, by rotation about said rotary shaft, in at least one open position, in which the air is able to pass via the air inflow, and a closed position, in which the flap prevents the air from passing via the air inflow;

a mechanical part adapted to maintain said rotary shaft in said housing when said mechanical part is secured to the frame;

The mechanical part includes an abutment, said flap being positioned against the abutment when said flap is placed in said open position.

The inventive system may thus constitute all or part of the AGS system of a vehicle.

More often than not, the rotary shaft of the flap lies substantially in the plane of the frame (i.e. in the principal plane of the frame).

The above-mentioned mechanical part may thus obstruct, totally or partially, the housing of the rotary shaft and may thus maintain the flap in place.

The fact that the mechanical part also includes an abutment facilitates the simplified assembly of the AGS. In fact, when the flap has been installed on the frame, no abutment will interfere with the installation. Consequently, once the attachment is finalized (i.e. by the addition of the mechanical part maintaining the rotary shaft in place), the abutment will be positioned automatically by means of the same movement in the factory.

Furthermore, the presence of the abutment makes it possible to limit the vibrations of the flap that are associated with the turbulent flow of the air at high speed entering the AGS when the flap is in the open position.

Because of this, the system makes it possible to minimize the vibrations of the flaps of the AGS by means of a system that is simple and inexpensive to install in the factory.

In one embodiment, the air inflow control system may further comprise a motor adapted to cause said flap to rotate. The motor may then be adapted to bring the flap against the abutment.

Advantageously, the motor may be further adapted to induce a supplementary rotation between 0° and 20° after the flap is against the abutment.

Thus, this induced supplementary rotation (for example at one extremity of the flap opposite the abutment) permits the flap to be placed under slight torsion, since the part of the flap in contact with the abutment will not be able to turn. This slight torsion makes it possible to maintain the flap in contact with the abutment, including in the presence of heavy turbulence, and thus to ensure adequate acoustic comfort when the AGS is open.

Of course, in this particular embodiment, the lower threshold of the range [0°; 20°] may be excluded, since it is stated that the motor induces a "supplementary rotation" at this point.

The motor may comprise a second abutment. The second abutment may then stop said motor when the supplementary angle is reached.

Thus, the control of the motor with regard to the supplementary rotation is simple. Adequate dimensioning of the second abutment of the motor makes it possible to fix the threshold of possible rotation induced by the motor in a simple manner.

For example, the frame may be configured in such a way as to permit the assembly of said mechanical part on the frame in an axis substantially perpendicular to a principal plane of the frame.

Thus, in this embodiment, the frame must not have any excrescences, or parts, or a general form capable of interfering with assembly in the direction that is substantially perpendicular to the principal plane of the frame.

Thus, when the frame is positioned flat on a workbench (horizontally, for example), it is possible to bring the mechanical part into a vertical orientation in order to be able to secure it to this frame. The assembly cinematics permit the use of simple and inexpensive assembly tools.

In addition, the abutment of the mechanical part may contain a bevel.

This bevel permits the abutment to find the strongest possible grip on the mechanical part (the wide part of the bevel then being situated on the side of the body of the mechanical part), while minimizing the use of material for the manufacture of this bevel. A compromise between the cost and durability of the mechanical part may thus be reached.

Furthermore, the mechanical part may be secured to the frame by screwing or by riveting. Other modes of attachment may also be used.

In one particular embodiment, the screwing or the riveting may be in an axis substantially perpendicular to a principal plane of the frame.

Thus, when the frame is positioned flat on a workbench (horizontally, for example), it is possible to screw or to rivet the mechanical part to the frame with a vertical movement. The assembly cinematics permit the use of simple and inexpensive assembly tools.

In one particular embodiment, the mechanical part includes a plurality of extensions intended to extend in a direction parallel to the rotary shaft of the flap, at least one extension among the plurality of extensions forming said abutment, the plurality of extensions exhibiting a generally sawtooth form.

Other characterizing features and advantages of the invention will become even more evident from a perusal of the following description. This is purely illustrative and should be read having regard for the accompanying drawings, in which:

DETAILED DESCRIPTION

Figure 1A:
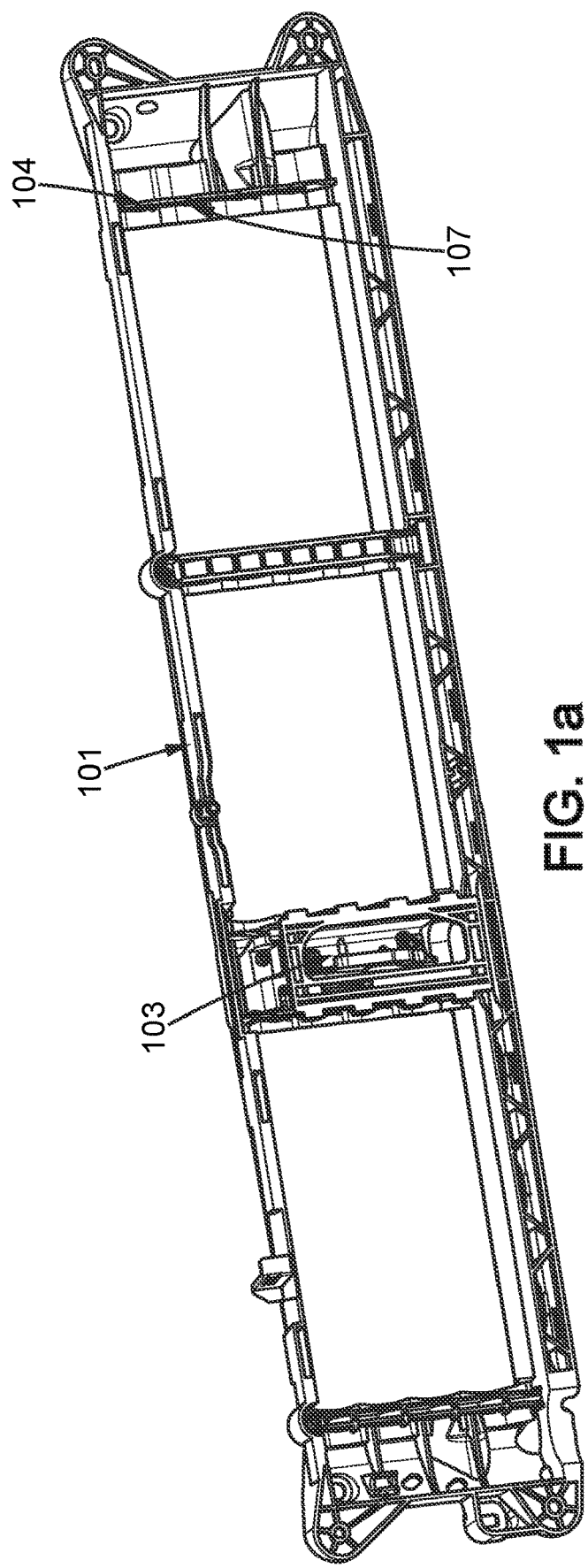
FIGS. 1(a) and 1(b) illustrate a particular embodiment of a frame of an active grille shutter with or without flaps.
Figure 1B:
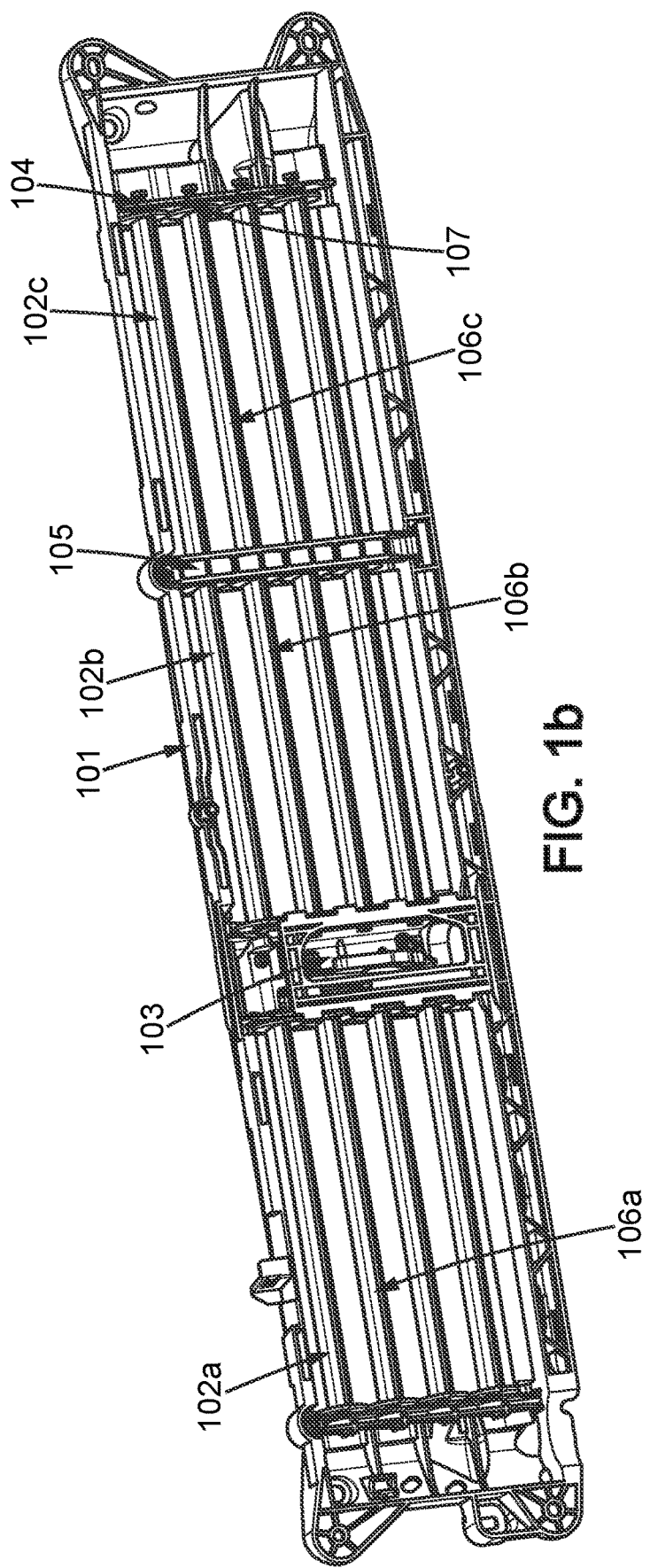

FIGS. 1(a) and 1(b) illustrate one particular embodiment of a frame of an active grille shutter respectively without and with flaps.

The frame 101 of an active grille shutter defines an air inflow and in particular comprises openings (e.g. three openings in this embodiment, although a different number is possible), making it possible to cause the air to circulate from the front of the vehicle towards the engine in order to cool it.

A motor 103 permitting flaps (not depicted in FIG. 1(a)) to be actuated, which flaps then obstruct the above-mentioned openings, may be mounted on the frame 101.

Furthermore, this frame 101 may include housings (e.g. 104 and 107) adapted to receive a rotary shaft of a flap. For example, the housing may be of complementary form to an extremity of the rotary shaft of a flap. These housings may be indentations formed in the frame and capable of receiving the rotary shafts of the flaps. It is, of course, possible to have housings other than indentations, such as clips or U-shaped parts.

FIG. 1(b) takes up the example of FIG. 1(a), in which flaps (102a, 102b, 102c, 106a, 106b, 106c) have been installed.

In this example, the flap 102 contains three parts: 102a, 102b and 102c. The parts 102a and 102b of the flap 102 are in direct contact with the motor 103. The part 102c of the flap 102 is connected to the part 102b via a bridging part 105 (for example a pivot). When the part 102b is driven causing it to rotate by the motor 103, the part 102c is also driven causing it to rotate by the action of the bridging part 105. The flap assembly 102 thus rotates in a synchronous manner, even if this flap 102 is composed of a plurality of independent parts (102a, 102b, 102c).

The same also applies for the other flaps (e.g. 106).

Of course, the flaps may contain a larger number of parts or a smaller number of parts, in particular depending on the selected embodiment and on the position of the motor 103.

Figure 2C:
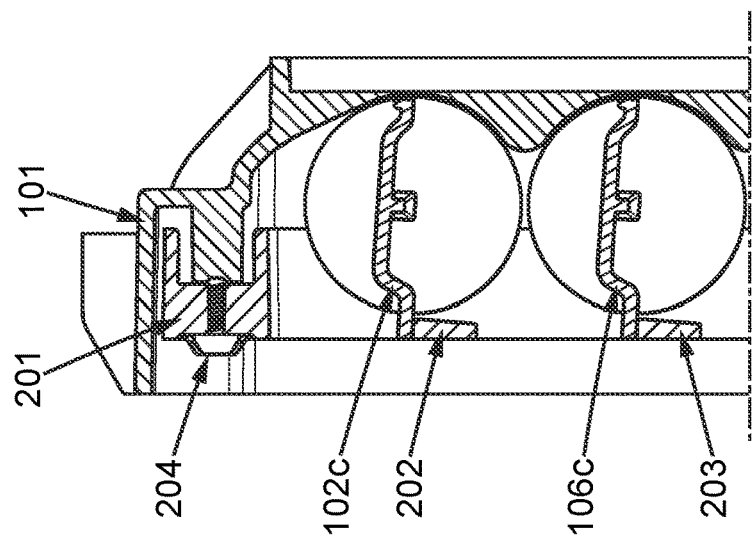
FIGS. 2(a) to 2(c) illustrate different opening positions of flaps of an active grille shutter in one embodiment of the invention.
Figure 2B:
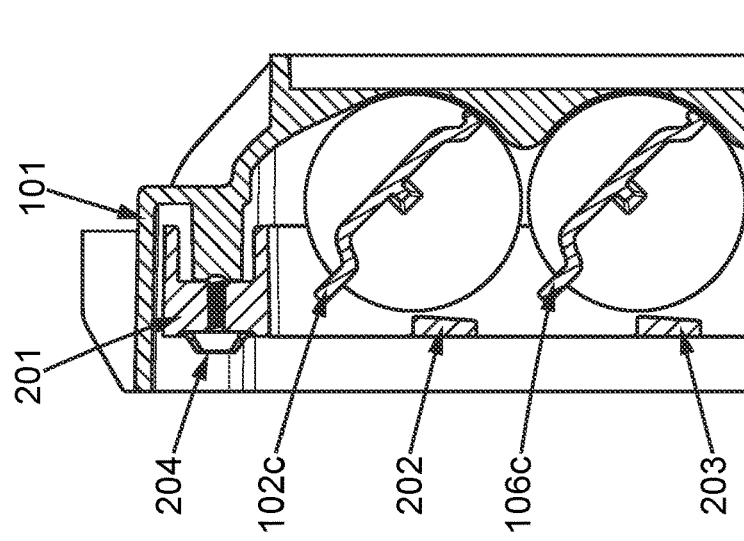
Figure 2A:
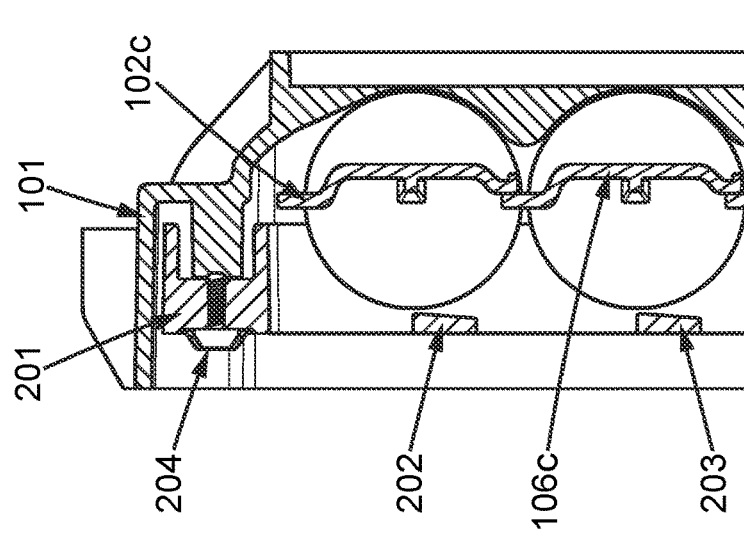

FIGS. 2(a) to 2(c) illustrate different opening positions of flaps of an active grille shutter in one embodiment of the invention.

In this embodiment, a mechanical part 201 (referred to in this context as a "clamp" in English) is secured to the frame 101 in particular by means of the screw 204. In particular, this mechanical part 201 obstructs (at least partially) the housings of the frame mentioned above.

Furthermore, lugs or abutments are provided on this mechanical part 201 (see the elements 202 and 203). These abutments are oriented, for example, in a direction parallel to the principal plane of the frame 201 (or in a direction perpendicular to the sectional plane in FIG. 2).

FIG. 2(a) is a sectional view of the active grille shutter for a closed position of the flaps. In this closed position, the air does not enter via the AGS. This section is made at one extremity of the active grille shutter in proximity to the indentations 104 and 107.

FIG. 2(b) is a sectional view of the active grille shutter for a semi-open position of the flaps. This semi-open position may be transitory (i.e. for a passage from an open position to a closed position, or vice versa), or it may be a stable opening position of the flaps (i.e. the flaps are maintained in this position for a prolonged period of time).

FIG. 2(c) is a sectional view of the active grille shutter for an open position of the flaps. In this open position, the air enters via the AGS. In this open position, the flap 102c is situated against the abutment 202, and the flap 106c is situated against the abutment 203. In other words, and for illustrative purpose, one extremity of the flap 102c (respectively 106c) bears against the abutment 202 (respectively 203).

The fact that the flap 102c or 106c is against the abutment 202 or 203 makes it possible to reduce the vibrations of this flap substantially when the air enters the active grille shutter. In order to guarantee contact between the abutment and the flap, it is also possible to force the motor 103 to induce a rotation of a supplementary angle between 0° and 20° after the flap is against the abutment (this does not signify that the flap assembly rotates through this supplementary angle). For example, a supplementary angle of 10° gives good results without damaging the motor 103. This is possible because the constituent material of the flap may be slightly deformable, and it is possible to apply a slight overtorsion thereto without rupture or excessive fatigue.

Figure 3A:
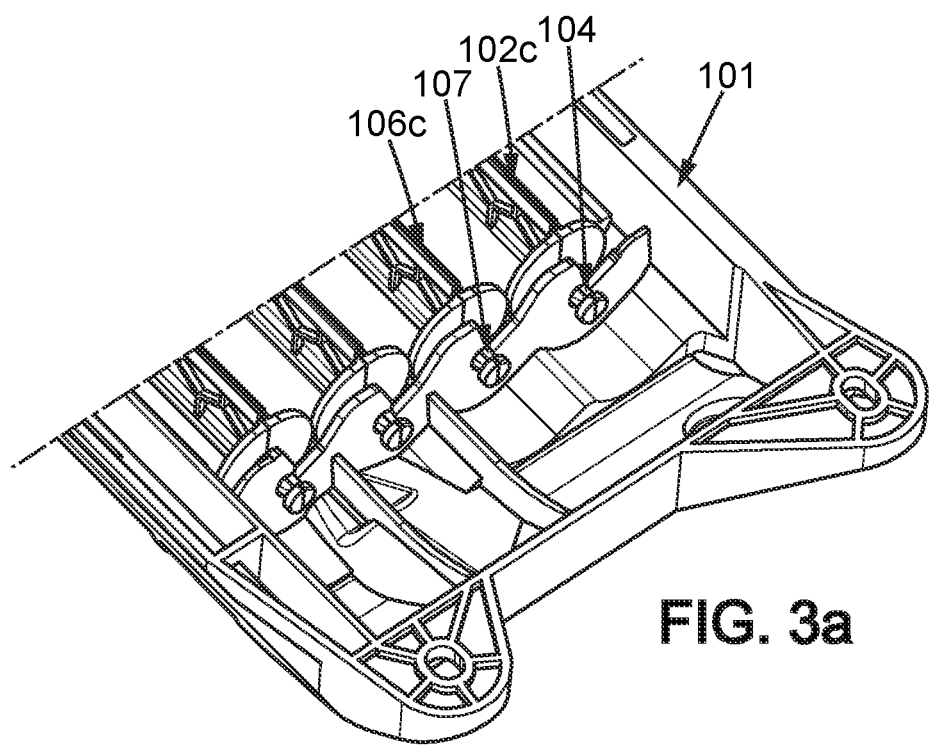
FIGS. 3(a) and 3(b) illustrate one extremity of the flaps of an active grille shutter with or without abutments in one embodiment of the invention.
Figure 3B:
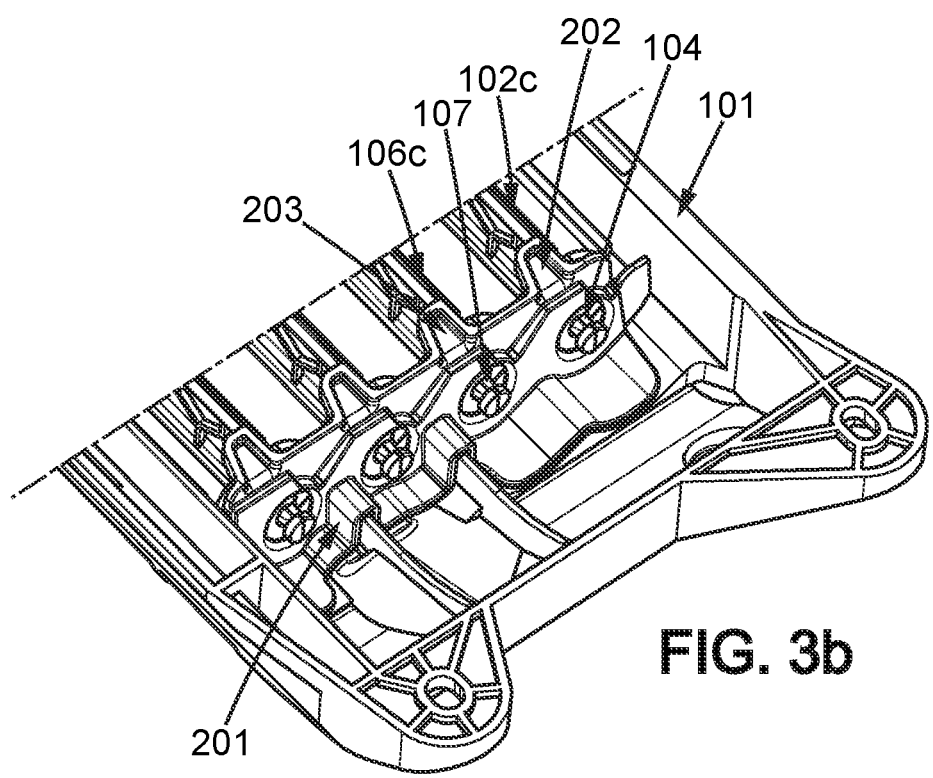

FIGS. 3(*a*) and 3(*b*) illustrate one extremity of the flaps of an active grille shutter with or without abutments in one embodiment of the invention.

In the embodiment in FIG. 3(*a*), the housings (e.g. 104 and 107) are provided in an oblique manner in the material of a surface of the frame 101 (this surface, in which the housings are provided, is perpendicular to the principal plane of the frame).

Thus, in order to engage the extremities of the rotary shafts of the flaps (e.g. 102*c* and 106*c*), and if the frame is placed horizontally on a workbench, the flaps are oriented at an angle of 45° in relation to the vertical (for example) in order to be able to insert them into their respective housings.

FIG. 3(*b*) illustrates the system in FIG. 3(*a*), with the addition of the mechanical part 201 (or "clamp"). This mechanical part 201 may be secured by a clip system to the frame 101. Another system of attachment is also possible.

In the embodiment in FIG. 3(*b*), the mechanical part 201 maintains the rotary shafts of the flaps in their respective housing. In particular, this mechanical part 201 may have extensions which make contact (or near contact) with the rotary shafts of the flaps when this mechanical part 201 is secured to the frame 101, and the contact maintains the rotary shaft at the bottom of the indentation.

The mechanical part 201 also includes abutments (e.g. 202 and 203) facing the flaps. These abutments permit the flaps to come into contact when the flaps are in the open position.

The abutments of the mechanical part 201 may be of any form. Advantageously, these abutments include bevels in order to find the strongest possible grip on the mechanical part (the wide part of the bevel being on the side of the body of the mechanical part 201), while minimizing the use of material for the manufacture of these bevels. A compromise between the cost and durability of the mechanical part 201 may thus be reached.

As a result of the particular conformation of the mechanical part 201, the attachment of this mechanical part 201 to the frame 101 is obtained in a direction close to the rotary shaft of the flaps.

Figure 4A:
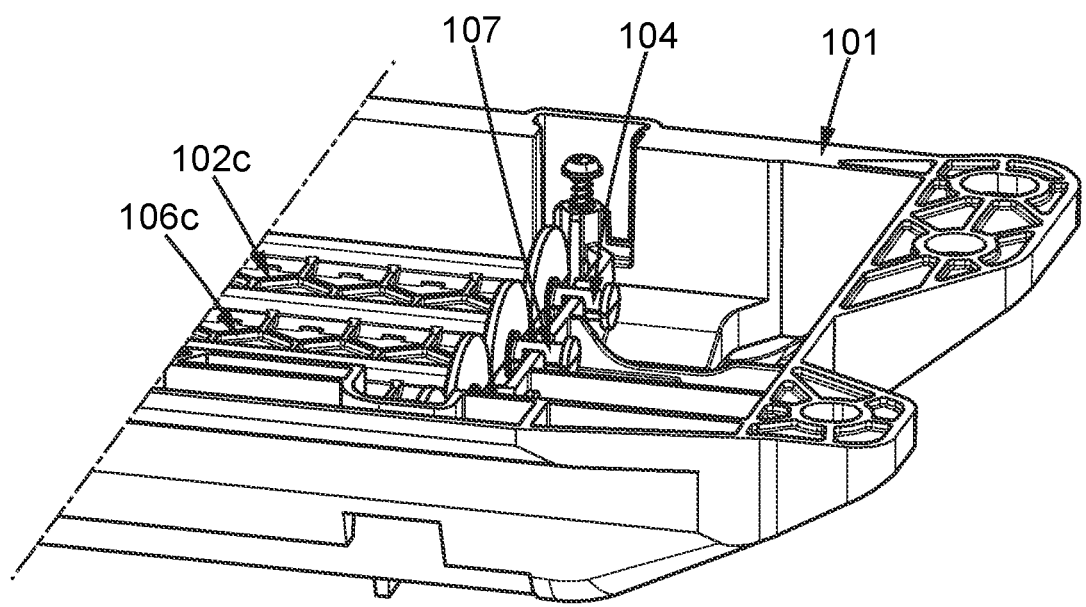
FIGS. 4(a) and 4(b) illustrate one extremity of the flaps of an active grille shutter with or without abutments in another embodiment of the invention.
Figure 4B:
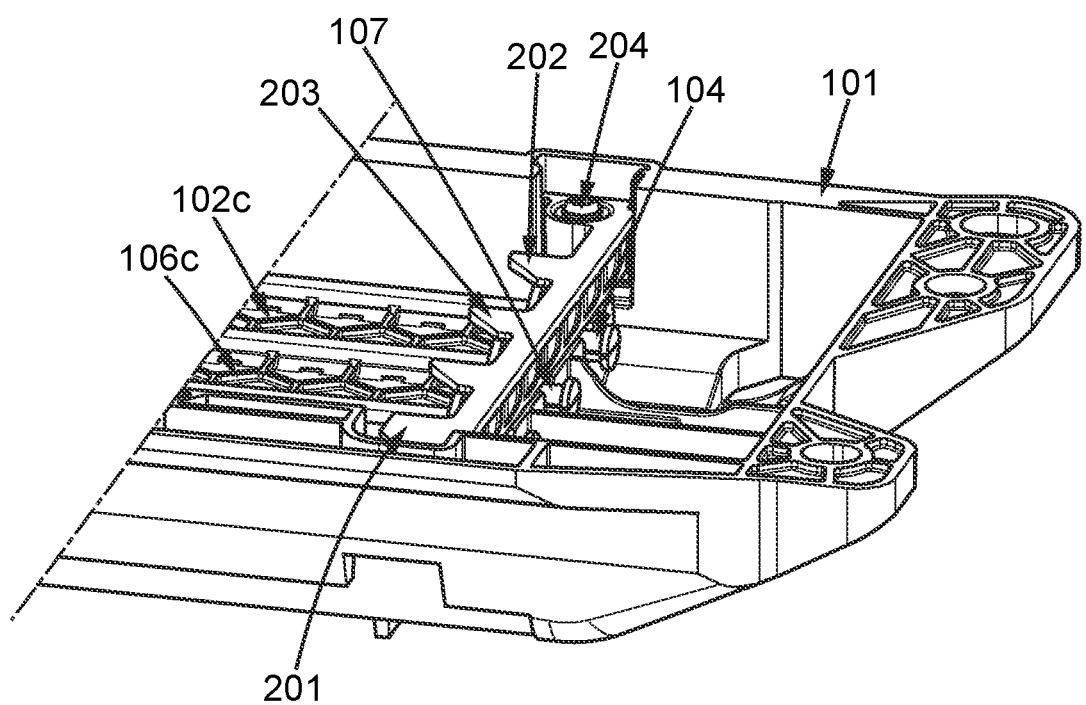

FIGS. 4(*a*) and 4(*b*) illustrate one extremity of the flaps of an active grille shutter with or without abutments in another embodiment of the invention.

In the embodiment in FIG. 4(*a*), the housings (e.g. 104 and 107) are produced in a vertical manner in the material of a surface of the frame 101 (this surface, in which the housings are provided, is perpendicular to the principal plane of the frame).

Thus, in order to engage the extremities of the rotary shafts of the flaps (e.g. 102*c* and 106*c*), and if the frame is placed horizontally on a workbench, the flaps are oriented in a vertical direction (or close to this vertical direction) in order to be able to insert them into their respective housing.

FIG. 4(*b*) illustrates the system in FIG. 4(*a*), with the addition of the mechanical part 201 (or "clamp" in English). This mechanical part 201 may be secured by a screw system 204 to the frame 101, the screw in this case being in a vertical direction (in particular in order to simplify assembly on industrial production lines). Another system of attachment is also possible.

In the embodiment in FIG. 4(*b*), the mechanical part 201 maintains the rotary shafts of the flaps in their respective housing. In particular, the "lower" surface of this mechanical part 201 may make contact (or near contact) with the rotary shafts of the flaps when this mechanical part 201 is secured to the frame 101, and the contact maintains the rotary shaft at the bottom of the housing.

The mechanical part 201 also includes abutments (e.g. 202 and 203) facing the flaps. These abutments permit the flaps to come into contact when the flaps are in the open position.

As a result of the particular conformation of the mechanical part 201, and if the frame is placed horizontally on a workbench, the attachment of this mechanical part 201 to the frame 101 may be carried out in a direction close to the vertical (in particular in order to simplify assembly on industrial production lines).

As indicated previously in relation to FIG. 2, the abutments of the mechanical part 201 may be of any form (in particular of beveled form).

Figure 5:
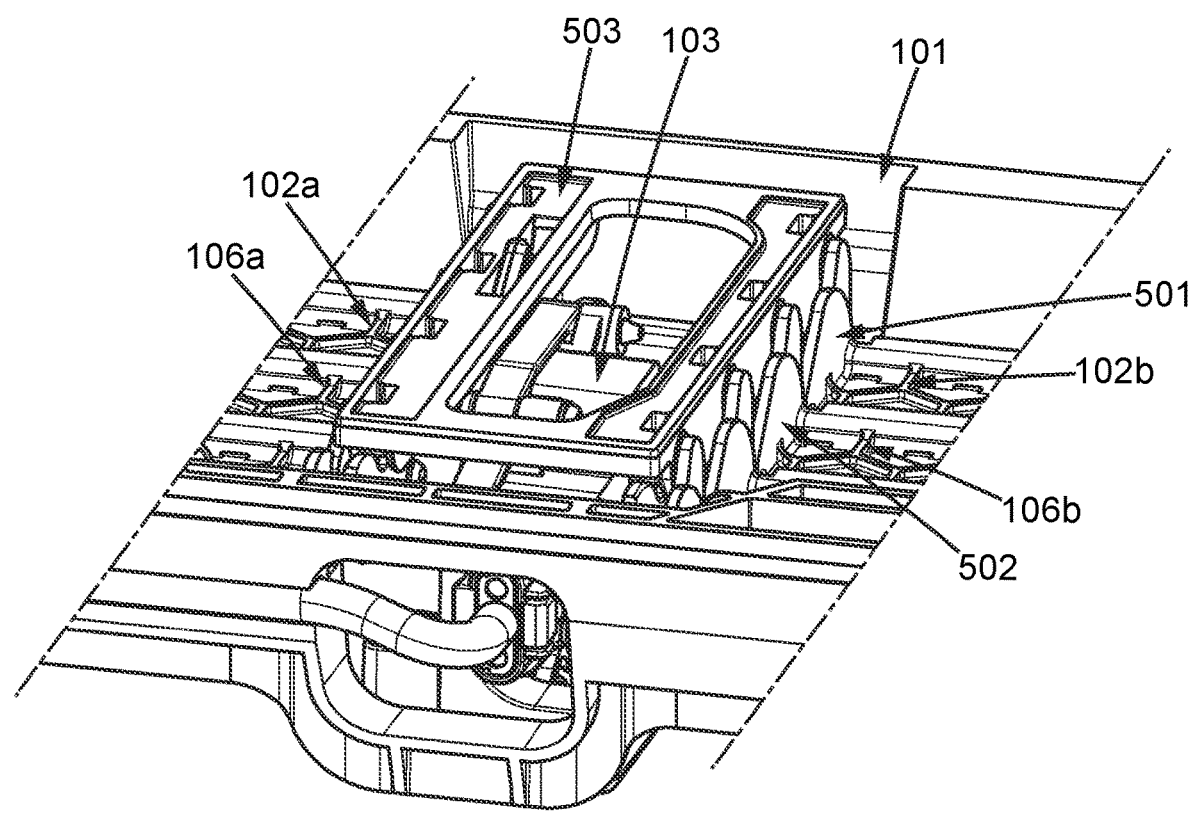
FIG. 5 illustrates an embodiment of a motor for controlling the opening of the flaps in one embodiment of the invention.

FIG. 5 illustrates an embodiment of a motor for controlling the opening of the flaps in one embodiment of the invention.

In this embodiment, the motor 103 may drive the flaps (e.g. 102 (i.e. 102*a* and 102*b*) and 106 (i.e. 106*a* and 106*b*)), causing them to rotate, by means of arms 501 and 502. In fact, the motor drives the mechanical part 503 in an elliptical trajectory while maintaining the general orientation of the mechanical part 503 constant (i.e. in a horizontal orientation in the example in FIG. 5). In other words, the mechanical part 503 undergoes translation on an elliptical trajectory.

This trajectory is adapted to drive each extremity of the arms of the flaps (e.g. 501 and 502) in a circular trajectory.

Actuation of the motor may thus permit the flaps (e.g. 102, 106) to be brought into an open position, the flaps then being in contact with the abutments (e.g. 202, 203) of the mechanical part 201. Furthermore, the motor may be configured to continue its movement after contact by the flaps with the abutments and, in so doing, to induce a supplementary rotation of a few degrees (between 0 and 20°, for example) at the extremities of the arms (e.g. 501 and 502) and, in so doing, to "force" the contact between the flaps and the abutments.

In order to implement this supplementary rotation, it is possible:

to program the motor in order to identify the starting and finishing positions of its movement;

or to propose that the mechanical part 503 comes into contact with the frame 101 (for example) when the end position has been reached, stopping of the motor then being conditional upon exceeding a value of the mechanical strength (force or torque, for example) in the area of the motor. The form of the mechanical part 503 may thus permit the simple definition of the desired supplementary rotation. This mechanical part 503 than acts as an abutment permitting the movement of the motor to be stopped when the supplementary angle is reached.

Of course, the present invention is not limited to the embodiments described above by way of example. It also extends to other variants.

Other implementations are possible.

The invention claimed is:

1. An air inflow control system for an active grille shutter, comprising:

a frame comprising at least one housing;

a flap comprising a flap rotary shaft, said flap rotary shaft being installed in said housing, the flap being capable of being placed, by rotation about said rotary shaft, in at least one open position and one closed position; and a mechanical part adapted to maintain said flap rotary shaft in said housing when said mechanical part is secured to the frame, wherein the mechanical part includes an abutment, said flap being positioned against a top surface of the abutment when said flap is placed in said open position.

2. The air inflow control system for an active grille shutter as claimed in claim 1, further comprising:

a motor adapted to cause said flap to rotate, wherein the motor is adapted to bring the flap against the abutment.

3. The air inflow control system for an active grille shutter as claimed in claim 2, wherein the motor is further adapted to induce a supplementary rotation between 0° and 20° after the flap is against the abutment.

4. The air inflow control system for an active grille shutter as claimed in claim 3, wherein the motor comprises a second abutment, and wherein the second abutment stops said motor when the supplementary angle is reached.

5. The air inflow control system for an active grille shutter as claimed in claim 1, wherein the frame is configured in such a way as to permit the assembly of said mechanical part on the frame in an axis substantially perpendicular to a principal plane of the frame.

6. The air inflow control system for an active grille shutter as claimed in claim 1, wherein said abutment of said mechanical part contains a bevel.

7. The air inflow control system for an active grille shutter as claimed in claim 1, wherein the mechanical part is secured to the frame by screwing or by riveting.

8. The air inflow control system for an active grille shutter as claimed in claim 7, wherein the screwing or the riveting is in an axis substantially perpendicular to a principal plane of the frame.

9. The air inflow control system for an active grille shutter as claimed in claim 1, wherein the mechanical part includes a plurality of extensions intended to extend in a direction parallel to the rotary shaft of the flap, at least one extension among the plurality of extensions forming said abutment, the plurality of extensions exhibiting a generally sawtooth form.

10. An air inflow control system for an active grille shutter, comprising:

a frame comprising at least one housing;

a flap comprising a flap rotary shaft, the flap being capable of being placed in at least one open position and one closed position; and a mechanical part that maintains the rotary shaft in the housing when the mechanical part is secured to the frame;

wherein:

the mechanical part includes a first abutment, said flap being positioned against a top surface of the first abutment when said flap is placed in said open position, and the motor comprises a second abutment, the second abutment stops said motor when a predetermined stopping position for the flange is reached.

11. An air inflow control system for an active grille shutter, comprising:

a frame comprising at least one housing;

a flap comprising a flap rotary shaft, the flap rotary shaft being installed in said housing, the flap being placed, by rotation about the rotary shaft, in at least one open position and one closed position;

a mechanical that maintains the flap rotary shaft in the housing when the mechanical part is secured to the frame; and a motor that rotates the flap, the motor being adapted to bring the flap against an abutment, wherein the mechanical part comprises the abutment, said flap being positioned against a top surface of the abutment when said flap is placed in said open position.

* * * * *